United States Patent [19]

Trcka et al.

[11] 4,453,200
[45] Jun. 5, 1984

[54] APPARATUS FOR LIGHTING A PASSIVE DISPLAY

[75] Inventors: James S. Trcka; Robert J. Thorkildson, both of Cedar Rapids, Iowa

[73] Assignee: Rockwell International Corporation, El Segundo, Calif.

[21] Appl. No.: 284,904

[22] Filed: Jul. 20, 1981

[51] Int. Cl.³ .............................................. F21V 7/04
[52] U.S. Cl. ...................................... 362/31; 362/29; 362/30; 362/307; 362/311; 362/341; 362/355; 362/356; 362/362
[58] Field of Search .................. 362/28, 29, 30, 31, 362/318, 307, 311, 341, 355–356, 362

[56] References Cited

U.S. PATENT DOCUMENTS

| | | | |
|---|---|---|---|
| 2,681,634 | 6/1954 | Polley | 362/28 X |
| 3,029,334 | 4/1962 | Anderson et al. | 362/31 |
| 3,246,133 | 4/1966 | Hensleigh | 362/268 |
| 3,497,686 | 2/1970 | Young | 362/31 |
| 3,729,626 | 4/1973 | Thurlow et al. | 362/31 |
| 3,752,974 | 8/1973 | Baker et al. | 362/31 |
| 3,808,415 | 4/1974 | Hurst | 362/31 |
| 4,277,817 | 7/1981 | Hehr | 362/31 |
| 4,282,560 | 8/1981 | Kringel et al. | 362/31 X |
| 4,323,952 | 4/1982 | Proske | 362/318 X |
| 4,387,414 | 6/1983 | Hensleigh | 362/31 |

FOREIGN PATENT DOCUMENTS

| | | | |
|---|---|---|---|
| 2722470 | 11/1978 | Fed. Rep. of Germany | 362/31 |
| 2827573 | 1/1980 | Fed. Rep. of Germany | 362/31 |

Primary Examiner—Peter A. Nelson
Attorney, Agent, or Firm—Richard A. Bachand; George A. Montanye; H. Fredrick Hamann

[57] ABSTRACT

Apparatus for front lighting a display includes a light distributing wedge, spaced from the front of the display to be lighted, through which the display can be viewed. A light source is provided aside the wedge to direct light to an inter space between the wedge and the display. A reflective surface is provided at the wide end of the wedge to reflect light incident upon it. Thus, light from the light source is directed onto the display through various reflecting and refracting paths, including directly onto the display from the light source, reflected from the interior surface of the wedge onto the display, and refracted and reflected within the wedge to be emitted in the direction of the display.

8 Claims, 3 Drawing Figures

APPARATUS FOR LIGHTING A PASSIVE DISPLAY

BACKGROUND OF THE INVENTION

1. Field of the Invention

This invention relates to non-light-emitting or passive displays, and, more particularly, to means and apparatus for lighting such passive or non-light-emitting displays.

2. Description of the Prior Art

As non-light-emitting or passive displays, such as liquid crystal displays, electrophoretic and electrochromic displays, increase in popularity and usage, considerations have been given to lighting such displays, especially for nighttime use, or for use in surroundings which are not well-lit. With particular reference to liquid crystal displays, such displays typically modulate light which is incident upon it. One limitation of popularly used twisted nematic liquid crystal displays is that the contrast ratio between an actuated segment and the display background varies, depending upon the angle from which the display is observed. The limitation in inherent, and is due to the optical properties of the liquid crystal material and polarizers which are part of the display. This variation is exhibited when light is provided from either the front or the rear of the display. However, the viewing angle limitation for such device is much more severe for the back-lighted condition in which light passes through the display only once; whereas, for the front-lighted condition, light passes through twice.

In certain environments, such as in an airplane cockpit, for example, an as-wide-as-possible viewing angle is desired (as contrasted, for example, from an ordinary watch display in which the viewing angle need not be particularly extensive). Thus, it is desirable to front-light displays of the twisted nematic liquid crystal display type, both to achieve a higher contrast ratio and to increase the viewing angle.

It is known in the art to light electromechanical displays and such with a transparent planar surface overlying the display, the surface having a wedge-shaped cross-section for light distribution. The light from the light source is usually injected at the large end of the wedge and allowed to bounce back-and-forth until the critical angle of the wedge is exceeded. The light then escapes the wedge to fall upon and light the underlying display. In some instances, an inverted wedge has also been used in combination with a lighting wedge, as above described, to reduce stray light. Spherical wedges, lenses which can be considered a combination of a lighting wedge and an inverted wedge, have also been used to light displays. In such cases, light is injected in one portion of the wedge and it is reflected and redirected in the inverted portion onto the display.

SUMMARY OF THE INVENTION

In light of the above, it is, therefore, an object of the invention to provide an apparatus for front-lighting a passive display.

It is another object of the invention to provide an apparatus of the type described which enables the display to be viewed from as wide an angle as possible.

It is another object of the invention to provide an apparatus of the type described which provides an improved contrast ratio for displays of the twisted nematic liquid crystal display type.

It is another object of the invention to provide an apparatus of the type described which provides uniform lighting across the face of a large area display.

It is another object of the invention to provide an apparatus of the type described suitable for use in avionics environments.

These and other objects, features and advantages will become apparent to those skilled in the art from the following detailed description when read in conjunction with the accompanying drawings and appended claims.

The invention, in its broad aspect, presents an apparatus for front-lighting a display. The apparatus includes a light-distributing wedge, spaced from the front of the display to be lighted, through which the display can be viewed. A light source means is provided aside the wedge and display to inject light therebetween. Also, reflective means are provided adjacent the wide end of the wedge to reflect light within the wedge incident thereupon into the wedge to be dispersed onto the display. In one aspect of the invention, reflective means are provided adjacent the light source to concentrate the light of the light source means to between the wedge and the display.

BRIEF DESCRIPTION OF THE DRAWING

The invention is illustrated in the accompanying drawing wherein.

In the various figures of the drawing, like reference numerals are used to denote like or similar parts. In addition, various dimensions in the drawing have been exaggerated or distorted for clarity of illustration and for ease of description.

DETAILED DESCRIPTION OF THE PREFERRED EMBODIMENTS

Figure 1:
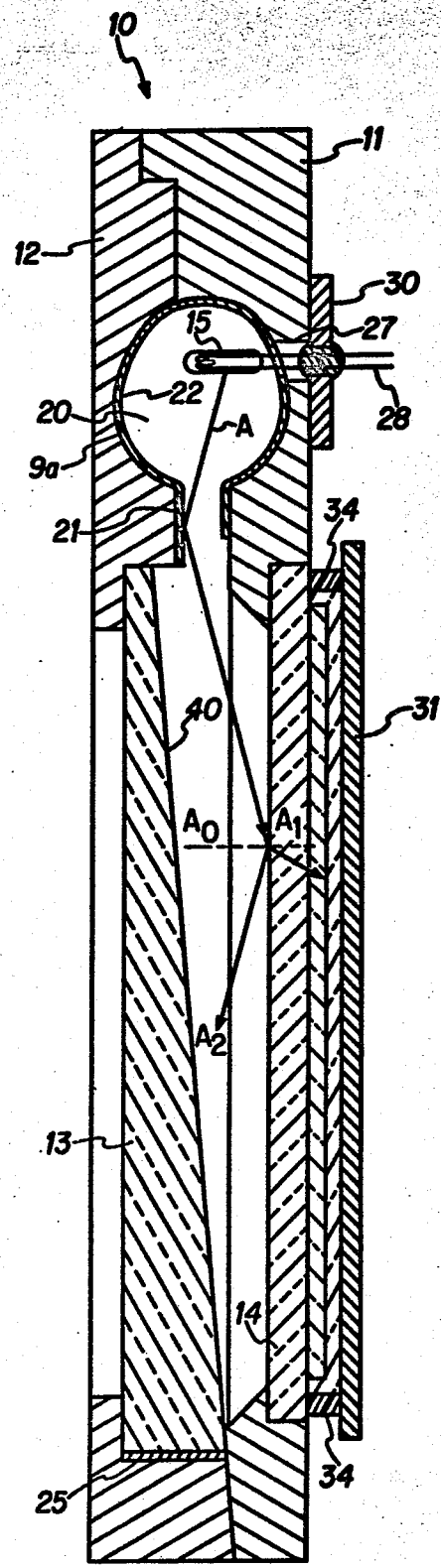
FIGS. 1, 2, and 3 are cross-sectional views of apparatus for lighting a passive display, in accordance with a preferred embodiment of the invention, showing, respectively, various paths followed by light from the light source in lighting the display.

With reference to the figures of the drawing, the lighting apparatus 10, in accordance with a preferred embodiment of the invention, includes a rear bezel 11 and a front bezel 12. The front bezel 12 carries a lighting wedge 13 of glass or other transparent material. The rear bezel 11 carries a passive display device; in the preferred embodiment illustrated, the display device is shown as a liquid crystal display 14.

Aside the lighting wedge 13 and liquid crystal display 14 is a lighting means, an incandescent lamp 15 being illustrated. The incandescent lamp 15 is connected to an energizing source, not shown, and is located in a light-collecting cavity 20. In the embodiment illustrated, the light-collecting cavity 20 is of spherical configuration having a neck or throat portion 21 extending to between the wedge 13 and display 14. The interior of the collecting cavity 20, as well as the neck or throat portion 21, is coated with a reflective surface 22, which serves to redirect stray light from the light source 15 into the region and in the direction of the wedge 13 and display 14, as below described in detail.

An additional reflective surface 25 is provided across the broad end of the wedge 13 to contain light within the wedge 13, as below described in detail. It should be noted at this juncture that the lighting wedge 13 is oriented with its narrow end adjacent the light-emitting means and its broad end generally away from the light-emitting means. This arrangement serves to efficiently direct light from the light-emitting means, after reflection, onto the display, as will become apparent from the description below.

The light collecting cavity 20 additionally includes an opening 27 through which wires 28 may lead to the lamp 15, and, additionally, through which the lamp 15 may be passed for replacement.

Termination boards 30 and 31 are provided to respectively enclose the collecting cavity 20 and the display 14. In the case of the termination board 31, it is spaced from the rear bezel 11 and the display 14 by an elastomeric connector 34. Thus, the entire display apparatus is completely self-enclosed.

In operation, light from the lamp 15 illuminates the display 14 by various mechanisms as follows. With reference to FIG. 1, some of the light, denoted by line A, is reflected within the neck or throat 21 to impinge directly onto the front surface of the display 14 as shown. When the light beam A strikes the front surface of the display 14 it is divided into two portions, a first portion, $A_1$, entering the display to light the display in known fashion. The second portion, $A_2$, is reflected from the display in the direction of the wedge 13 to be redirected in the fashion illustrated with reference to FIG. 2, presently to be described.

Figure 2:
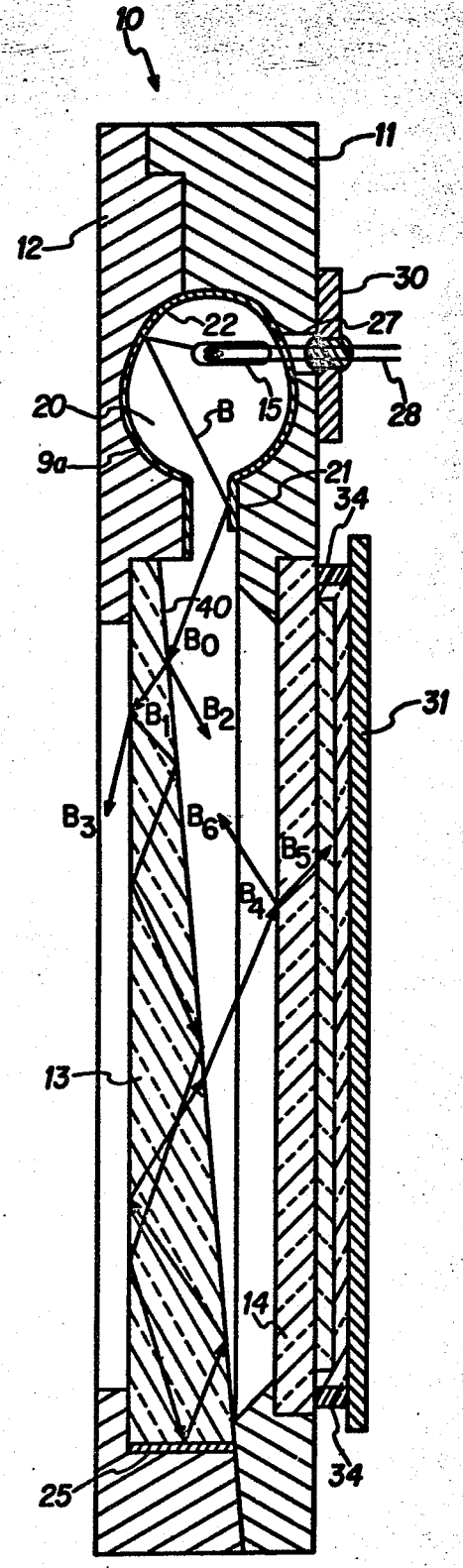

With reference to FIG. 2, a portion, B, of the light emitted from lamp 15, which may be internally reflected within the collecting cavity 20, strikes a reflective portion within the throat 21 to be directed toward the interior face 40 of the wedge 13. A first portion, $B_2$, of the light beam B is reflected from the surface 40 of the wedge 13 in the direction of the display 14 to illuminate the display 14 in the fashion described below with reference to FIG. 3. A second portion, $B_1$, enters the wedge 13, and is internally reflected and re-reflected therein until the angle at which the light strikes a reflecting surface exceeds the critical angle of the wedge to emerge therefrom. As shown, the light wave may traverse to the wide end of the wedge 13 to be reflected from the reflective surface 25 to continue the reflection and re-reflection within the wedge 13. When the light beam $B_1$ finally emerges from the lighting wedge 13, it is directed onto the display 14, and, upon striking the display 14, a portion, $B_5$, enters the display for lighting it. A portion, $B_6$, is reflected from the surface of the display 14. It should also be noted that when the light beam B is reflected within the interior of the wedge 13, that some of the light may be lost, as shown by light beam $B_3$.

Figure 3:
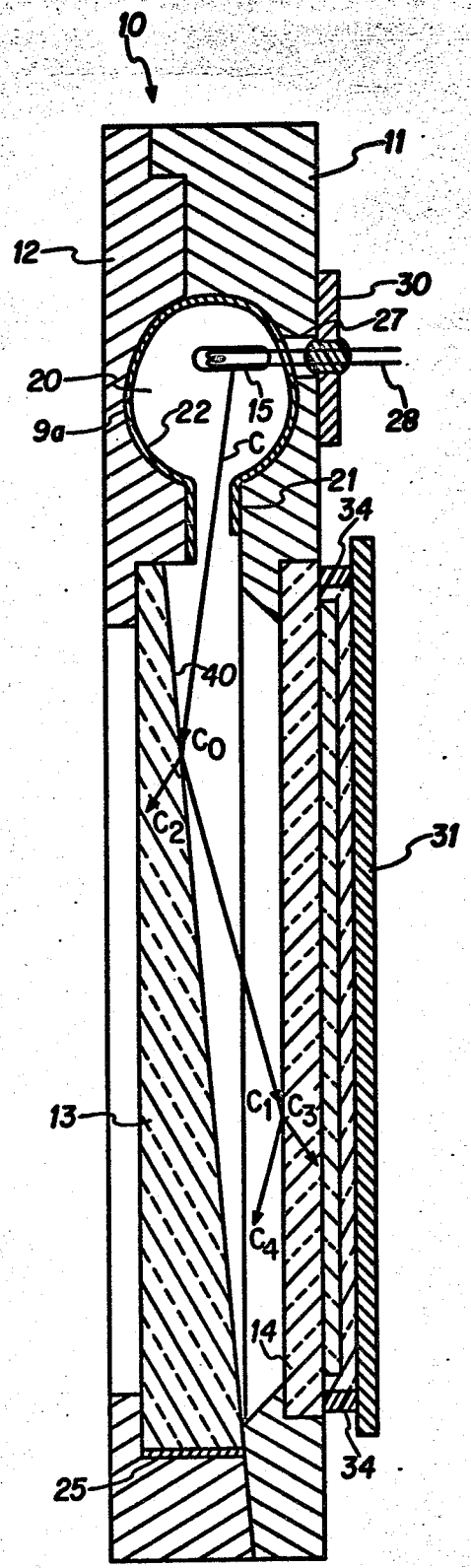

With reference now to FIG. 3, a light beam C emitted from the lamp 15 strikes the wedge 13 directly. A first portion, $C_2$, enters the wedge 13 to be reflected therewithin in the fashion above-described with reference to FIG. 2. A second portion, $C_1$, of the light beam C is reflected from the surface 40 of the light wedge 13 in the direction of the display 14. The portion, $C_1$, upon striking the display 14 enters the wedge, as denoted by a light beam $C_3$ to light the display. A second portion, $C_4$, is reflected from the surface of the display 14 in the direction of the front surface 40 of the wedge 13, and will be directed in similar fashion to the beam C upon its first contact as above described.

It should be noted that one of the features of the invention is that light from the light source impinges upon the display 14 in both directions, that is, from the direction of the light source 15, as can be seen from FIG. 1, and from the direction opposite the light source 15, as can be seen from FIG. 2. This bidirectional illumination will be more uniform and efficient than in those displays in which light is directed from only a single direction and in which stray light would normally be lost rather than redirected toward the display.

Although the invention has been described and illustrated with a certain degree of particularity, it is understood that the present disclosure is made by way of example only and that numerous changes in the arrangement and combination of parts may be resorted to by those skilled in the art without departing from the spirit and scope of the invention as hereinafter claimed.

We claim:

1. A front-lighted display system comprising:
    a display having a front surface from which visual indications can be viewed;
    a transparent light-distributing wedge having a narrow end and a wide end containing a reflective surface thereon, said wedge being spaced from the front surface of the display to form a space between the wedge and display and positioned such that the display can be viewed through said wedge; and
    means positioned adjacent the narrow end of said wedge and display and coupled for introducing light into the space between said wedge and display such that a portion of said light in said space is directed upon said wedge and is reflected onto said display, a portion of said light in said space is directed upon said wedge and is internally reflected within the wedge until it exits the wedge and illuminates said display, and a portion of said light in said space directly illuminates said display, whereby the display is illuminated bi-directionally resulting in a more uniformly lighted display.

2. The apparatus of claim 1 further comprising means adjacent to said means for introducing light for reflecting and concentrating said light into the space between said wedge and display.

3. An apparatus for front-lighting a passive, planar display comprising:
    a planar display;
    a transparent planar element coupled to said display and spaced therefrom such that said display is viewed through said planar element, said planar element having a wedge shape with a broad end and a narrow end;
    reflective means positioned adjacent said broad end of said planar element to reflect light internally within said planar element;
    means positioned adjacent to the narrow end of said wedge shaped planar element and coupled to said planar element and said display for introducing light into the space between said wedge shaped planar element and said display such that a portion of said light in said space is directed upon said wedge shaped planar element and is reflected onto said display, a portion of the light in said space is directed upon said wedge shaped planar element and is internally reflected within the wedge shaped planar element until it exits the wedge shaped planar element and illuminates said display, and a portion of said light in said space directly illuminates said display, whereby the display is illuminated bi-directionally resulting in a more uniformly lighted display; and
    light reflector means coupled to said means for introducing light for reflecting light into the space between said wedge shaped planar element and display.

4. The apparatus of claim 3 wherein said means for introducing light is at least one incandescent lamp.

5. An apparatus for front lighting a display comprising:
a transparent light distributing wedge having a narrow end and a broad end and a means adjacent said broad end for reflecting light internally within said wedge;
means coupled to said wedge for spacing said wedge from a display and positioning said wedge such that a display can be viewed through said wedge; and
means coupled adjacent the narrow end of said wedge for introducing light into the space between said wedge and display when said wedge is positioned adjacent a display such that a portion of said light in said space is directed upon said wedge and is reflected onto said display, a portion of light in said space is directed upon said wedge and is internally reflected within the wedge until it exits the wedge and illuminates said display, and a portion of said light in said space directly illuminates said display, whereby the display is illuminated by-directionally resulting in a more uniformly lighted display.

6. The apparatus of claim 5 wherein said wedge has a first planar surface and a second inclined planar surface forming opposed surfaces of said wedge, said planar surfaces being bounded by opposed planar surfaces forming a narrow end and a broad end of said wedge, said wedge further being positioned with respect to said means for introducing light such that said inclined planar surface is positioned to form the space between said wedge and display, and said first planar surface forms the surface through which a display is viewed.

7. The apparatus of claim 1 wherein said display is a twisted nematic liquid crystal display.

8. The apparatus of claim 3 wherein said planar display is a twisted nematic liquid crystal display.

* * * * *